United States Patent [19]
Enning et al.

[11] Patent Number: 5,346,276
[45] Date of Patent: Sep. 13, 1994

[54] BEARING STRUCTURE FOR THE BODYWORK OF A PASSENGER CAR

[75] Inventors: Norbert Enning, Denkendorf; Gundolf Kreis, Oberstimm; Karl Reiter, Lenting; Heinrich Timm, Ingolstadt, all of Fed. Rep. of Germany

[73] Assignee: Audi AG, Ingolstadt, Fed. Rep. of Germany

[21] Appl. No.: 50,367

[22] PCT Filed: Nov. 29, 1991

[86] PCT No.: PCT/EP91/02266
§ 371 Date: May 11, 1993
§ 102(e) Date: May 11, 1993

[87] PCT Pub. No.: WO92/11165
PCT Pub. Date: Jul. 9, 1992

[30] Foreign Application Priority Data
Dec. 20, 1990 [DE] Fed. Rep. of Germany ....... 4041023

[51] Int. Cl.⁵ ............................................. B62D 25/20
[52] U.S. Cl. .................................. 296/203; 296/194; 296/29; 296/189
[58] Field of Search ................ 296/204, 203, 194, 29, 296/30, 188, 189

[56] References Cited

U.S. PATENT DOCUMENTS

| | | | |
|---|---|---|---|
| 2,636,774 | 4/1953 | Lindsay | 296/28 |
| 2,709,106 | 5/1955 | Vahey | 296/28 |
| 4,466,653 | 8/1984 | Harasaki | 296/203 X |
| 4,573,734 | 3/1986 | Gass | 296/194 X |
| 4,669,777 | 6/1987 | Harasaki et al. | 296/189 X |
| 4,712,829 | 12/1987 | Hurten et al. | 296/203 |
| 4,900,082 | 2/1990 | Schwuchow et al. | 296/194 |
| 4,919,474 | 4/1990 | Adachi et al. | 296/194 |

FOREIGN PATENT DOCUMENTS

| | | |
|---|---|---|
| 0146716 | 7/1985 | European Pat. Off. . |
| 0291385 | 11/1988 | European Pat. Off. . |
| 1278855 | 9/1963 | Fed. Rep. of Germany . |
| 2713604 | 3/1977 | Fed. Rep. of Germany . |
| 3543929 | 6/1987 | Fed. Rep. of Germany . |
| 3740401 | 6/1989 | Fed. Rep. of Germany . |
| 2246877 | 12/1990 | Japan . |

Primary Examiner—Joseph D. Pape
Attorney, Agent, or Firm—Jacques M. Dulin

[57] ABSTRACT

A front end bearing structure for the bodywork of a vehicle of the type including a pair of spaced apart left and right side front longitudinal bearer members, each having an upstanding, substantially perpendicular support member for supporting a suspension strut mount at a location above its respective front longitudinal bearer member. Each suspension strut mount is also supported at a front end portion thereof by an additional slanted supporting bearer member which is extended upwardly and rearwardly from a connection point on each front longitudinal bearer member at a point in front of the location of the juncture of the perpendicular support member and front longitudinal bearer member. In this way, each slanted supporting bearer member forms a closed triangular framework with its respective front longitudinal bearer member and perpendicular support member. The angle subtended by the slanted supporting bearer member and the longitudinal bearer member is preferably about 45°. The resulting geometry provides for a stable and rigid connection and also promotes the favorable distribution of impact forces throughout the bearing structure in the event of a head-on collision. In an alternate embodiment, the perpendicular support member for the suspension mount is enclosed by a hollow section along its entire length to form a favorably rigid closed cross-sectional bearer member.

20 Claims, 2 Drawing Sheets

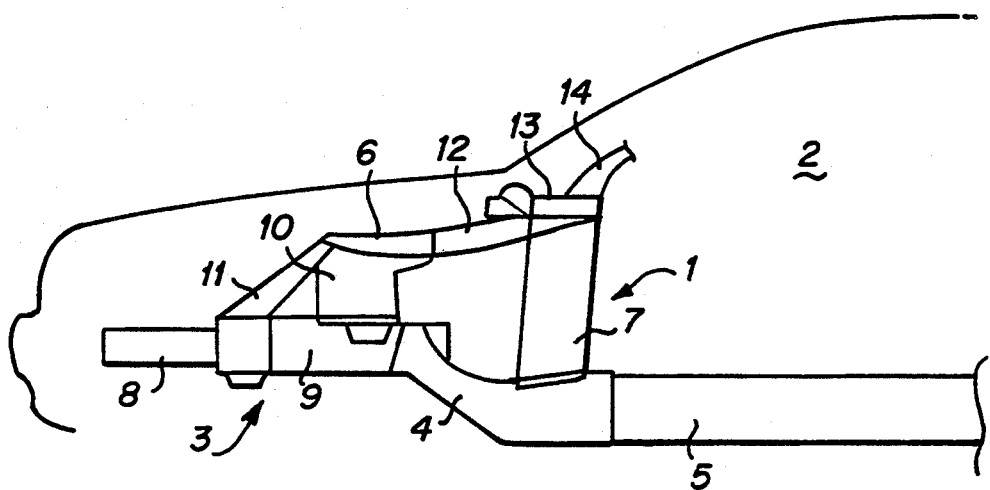
Fig_1
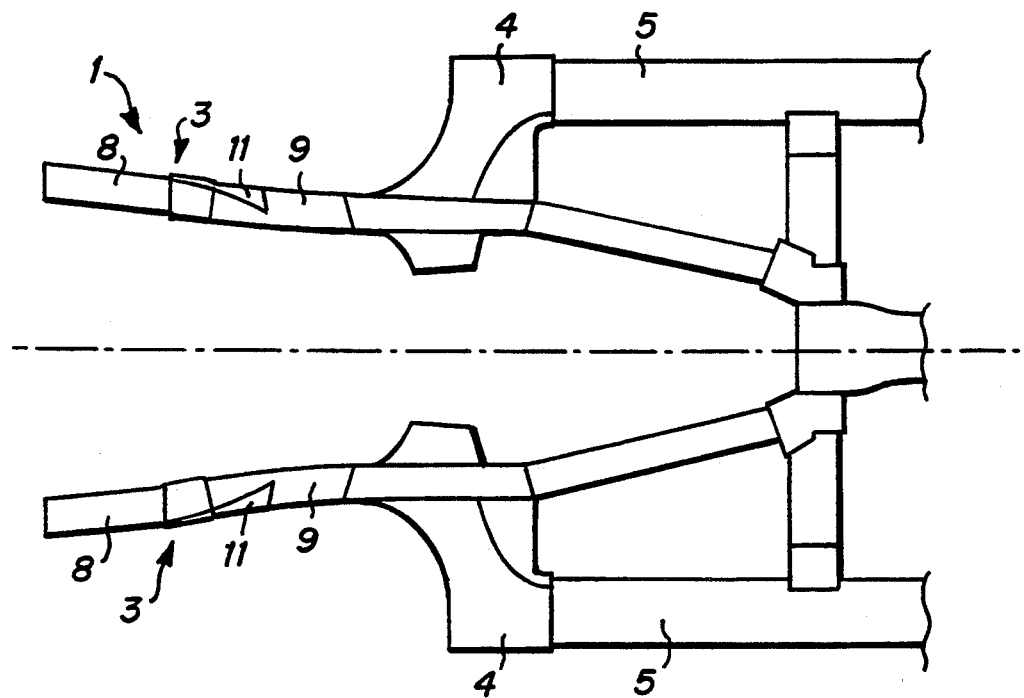
Fig_2

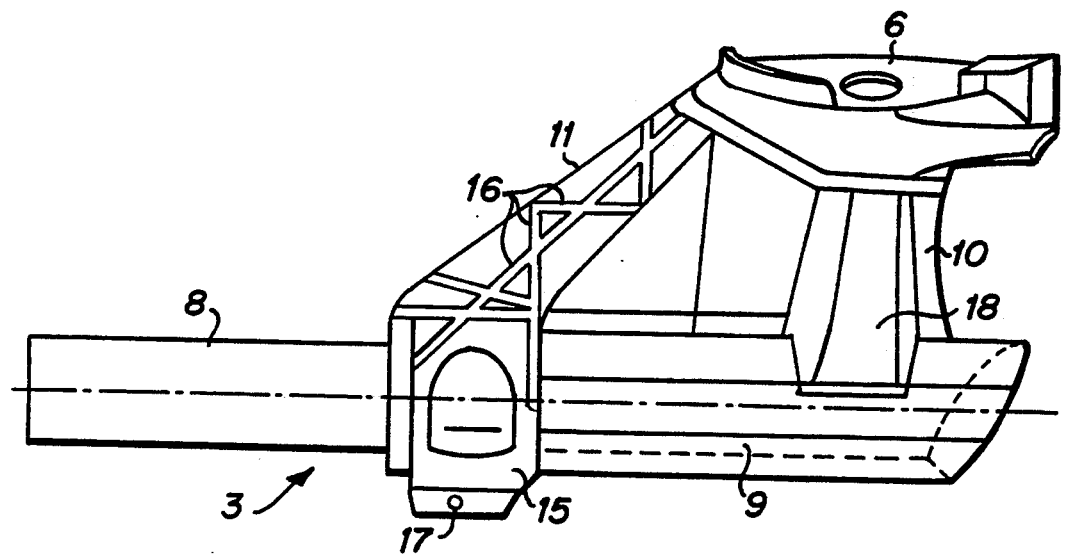
Fig_3
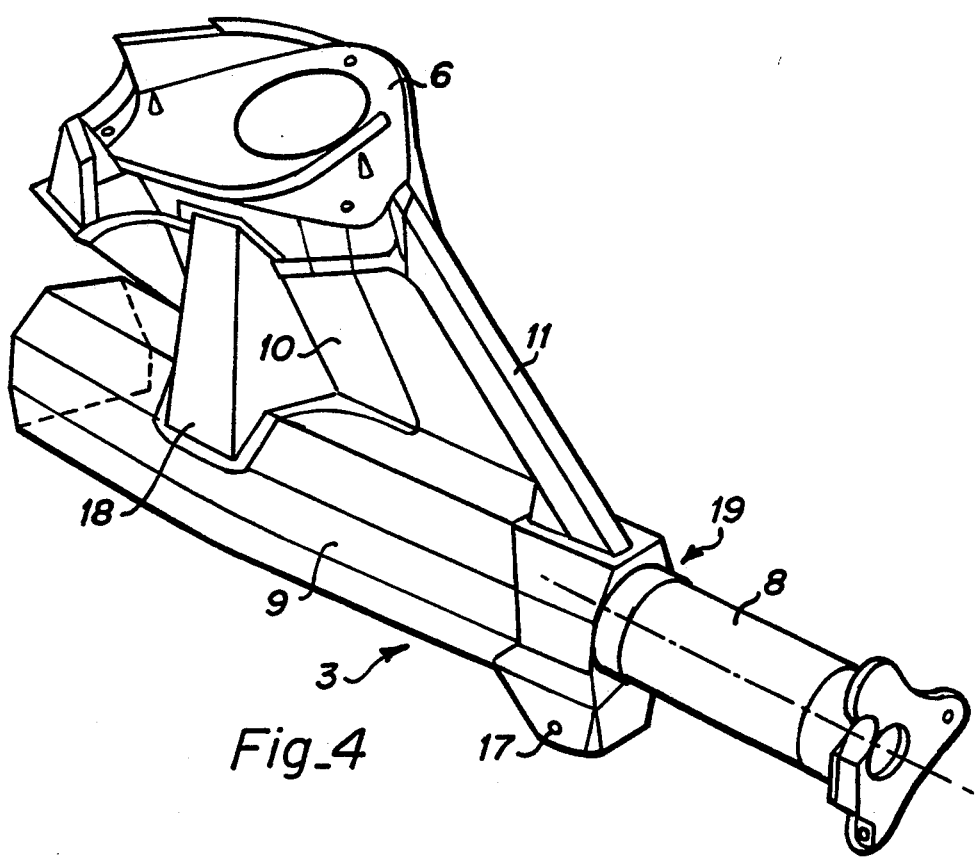
Fig_4

BEARING STRUCTURE FOR THE BODYWORK OF A PASSENGER CAR

FIELD

The present invention concerns improvements relating to a front-end bearing structure for the bodywork of a motor vehicle and more particularly, but not exclusively passenger vehicles.

BACKGROUND

The familiar front-end bearing structure for a passenger car bodywork typically comprises a pair of generally horizontal bottom front longitudinal bearers disposed spaced apart along opposite sides of the vehicle body. Each front longitudinal bearer has an upright bearer mounted along an upper surface thereof for supporting a suspension strut mount at a spaced distance above its respective front longitudinal bearer.

The individual bearer members of the front-end bearing structure of the type described above are typically fabricated from sheet metal parts. The hollow-section bearers, for example, are made from at least two deep-drawn metal sheets which are welded together. The suspension strut mounts, also made from sheet metal parts, are embedded in the bell structure of deep-drawn wheel housings in accordance with the conventional practice. The wheel housings consist of open sheet metal shells which are connected to the underside of the longitudinal bearers. Applied force is guided across the sheet metal elements as thrust walls.

In addition, in the known designs, an auxiliary frame is fastened to the bottom front longitudinal bearers forwardly of the suspension strut mounts to form a compound bearer having front screw fastening points for securing an additional assembly thereto, such as, for example, a front bumper assembly. The result is that the suspension strut mount is a heavily loaded and heavily stressed part of the body structure.

In the conventional sheet metal front end bearing structural designs of the prior art, costly reinforcement measures are needed to achieve the requisite rigidity and stiffness for the bearing structure in this region. Also, the desired bearing structure must ensure a stable support for mounting an auxiliary frame on the bottom longitudinal bearers at the front screw fastening points of the auxiliary frame. This is especially important in order to pass the required crash tests.

The steel sheets used to construct such self-supporting vehicle bodyworks are typically shaped in a deep drawing process. While the dies used for shaping the steel sheets are relatively expensive, they do provide a cost-favorable solution for mass production since they permit large production runs. However, in view of the high investment costs for all the required dies, the aforesaid process is very cost-intensive for smaller production runs.

A more cost-favorable solution for small production runs is known, for example, from European Patent document EP 0 146 716 wherein it is disclosed a vehicle body for a passenger car having a bearing structure comprising of hollow section frame members which are joined together by node connector elements. The hollow section frame members are formed as extruded aluminum sections and the node connector elements are formed as light metal cast pieces. In addition to being a more cost-favorable solution for small production runs, the aluminum bodywork disclosed in EP 0 146 716 is lighter in weight and is more resistant to corrosion than a sheet metal bodywork.

However, the suspension strut mount as well as its support on its respective longitudinal bearer for this design are also fabricated from sheet metal parts in a manner similar to the conventional all sheet metal self-supporting bodywork as described above. Accordingly, similar costly reinforcement measures must also be taken to ensure adequate rigidity and stiffness of the bearing structure in this case.

From Japanese patent document JP-A-2246 877 there is disclosed a reinforced front wheel apron and suspension strut mount arrangement designed as a self-supporting sheet metal structure for improving the rigidity in a front engine compartment in a vehicle bodywork. The reinforced front wheel apron comprises two portions including a first inward portion having a U-shaped cross section and a flat plate-like outer portion. When assembled, the two portions are joined by a welded joint and form a hollow section supporting bearer which extends forwardly in the horizontal direction starting from the A post at an upper edge of the wheel apron and continues to a point in front of the suspension strut mount. From there the hollow section supporting bearer angles downwardly in a substantially vertical direction to join the bottom longitudinal bearer. The metal sheets which form the suspension strut mount also form a brace with this hollow section supporting bearer. In this design each wheel housing is reinforced by sheet metal pieces.

In the arrangement described, a generally triangular framework is formed by the downwardly slanting forwardmost portion of the hollow section supporting bearer, the bottom longitudinal bearer and the upstanding support for the suspension strut mount. This triangular framework, in combination with the additional portion of the hollow section bearer which extends in the rearward longitudinal direction from the upstanding support for the suspension strut mount to the A post, divides and distributes the impact force associated with a frontal collision along the frame members. In particular, a first portion of the impact force is directed through the bottom longitudinal bearer to the door sill and floor region and a second portion of the impact force is directed through the substantially vertically upwardly slanted portion of the hollow section supporting bearer, where it then continues through the suspension strut mount to the upper region of the door column and roof region via the substantially horizontal portion of the hollow section supporting bearer which connects the suspension strut to the A post.

In this design, however, only a small portion of the impact force is absorbed or dissipated by the hollow section supporting bearer portion of the front wheel apron, since it extends in the horizontal direction parallel to the bottom longitudinal bearer over most of its length before it abruptly slants substantially vertically downward to join the bottom longitudinal bearer at its forwardmost end. As a result, the hollow section supporting bearer portion of the front wheel apron is more prone to buckling rather than absorbing impact energy during a frontal collision.

Further, since this document does not disclose or suggest the use of a two piece bottom longitudinal bearer, the problems associated with the interconnection of the multiple portions of a segmented longitudinal bearer are not addressed. Nor is there disclosed or suggested a simple solution for providing a sufficiently stable triangular interconnection of the suspension strut mount, the supporting bearer, and suspension strut bearer. Accordingly, in this design, the fastening point for an auxiliary frame assembly, such as for example a front bumper assembly, must be formed independently of the front bearing structure.

OBJECTS

It is therefore a principle object of the present invention to provide a stable and easily repairable front end bearing structure for a motor vehicle which is simple and is of low cost to produce.

It is another object of the present invention to provide a front end bearing structure wherein the load supporting bearer members are arranged in a triangular framework, such that the frontal impact forces associated with a front end collision are directed more or less equally along two forwardly disposed legs of the triangular framework such that the impact forces are dissipated to a safe level before reaching the passenger compartment.

Other and further objects will become evident from the following written description, drawings and appended claims.

DRAWINGS

FIG. 1 is a side view in schematic representation of a front end bearing structure in a motor vehicle bodywork constructed in accordance with one embodiment of the present invention.

FIG. 2 is a top view in schematic fashion of the front end bearing structure of FIG. 1.

FIG. 3 is a enlarged fragmentary side view of the front end bearing structure of FIG. 1 illustrating the detail of the suspension strut mount and its supporting bearer member fashioned as a cast metal piece.

FIG. 4 is an enlarged perspective view in the region of the suspension strut mount and illustrating an alternate embodiment of the supporting bearer member formed as a hollow bodied extruded section.

SUMMARY

In accordance with a preferred embodiment of the present invention, the front bottom longitudinal bearer members of the vehicle bodywork each comprise two hollow cross-section bearer portions or segments which are arranged in axial alignment and are connected in an end-to-end fashion. The dimensions for the cross sectional profile and wall thickness of the forwardmost bearer segments of the segmented longitudinal bearer members are preferably selected such that they are less rigid as compared to the second or more rearwardly disposed bearer segments. Such a familiar structural dimensioning for the segmented longitudinal bearer members is based on the idea that, in a frontal collision of low severity and having a low impact energy, only the forwardmost (and less rigid) bearer segments of the segmented longitudinal bearer members are subject to deformation, while the second, rearwardly disposed segments of the segmented longitudinal bearer members which are also adjoined by additional frame parts and assemblies remain undeformed.

In this way, the damage in a frontal collision of a low impact energy is confined to the front region of the bodywork, so that the passenger compartment is protected and only the forwardly disposed bearer segments of the segmented longitudinal bearer members need to be replaced when the bodywork is repaired. An advisable connection scheme for joining the two front longitudinal bearer segments is by a pair of half shell cast metal pieces which provide a positive locking for the adjoining ends of the two bearer segments when welded together. It is further advantageous to form a mount for receiving an upright supporting bearer member on one of the half shell pieces, so that the supporting bearer member does not require a separate fastening assembly.

In one embodiment of the invention, the supporting bearer member is fashioned as a cast piece having an open cross section provided with reinforcement ribs. Such a cast piece can be designed with joint-hole cuts, graduated wall thicknesses, and/or other known reinforcement features in order to meet or exceed the desired requirements for rigidity and crash behavior. In the prior art front end bearing designs having segmented longitudinal bearers made up of two bearer segments connected in end-to-end fashion, it is conventional practice to fasten the front screw fastening points of an auxiliary frame to the forwardmost bearer segment of each segmented longitudinal bearer at a location just in front of the juncture where the suspension strut mount is connected such that the auxiliary frame underlies the forward longitudinal bearer segment to form a compound beam.

Accordingly, it is advantageous in the present invention to integrate the fastening point for the auxiliary frame with the bottom or base portion of the cast piece used for connecting the adjoining ends of two longitudinal bearer segments in order to create a rigid support of the front fastening point of the auxiliary frame. Alternatively, the auxiliary frame may also be joined at the point where the supporting bearer member connects to the front segmented longitudinal bearer member.

Thus, the use of these cast shell connector pieces accomplishes the following three functions: (1) they provide support for the suspension strut bearer member; (2) they provide a positive locking connection for the two bearer segments of the segmented longitudinal bearer members; and (3) they provide possible connection points for fastening an auxiliary frame. This results in a more economical construction for the bearing structure, since additional fixtures for performing these separate functions are no longer necessary. Further, the use of the cast shell connector pieces greatly facilitates and simplifies the assembly process, since it is now a simple matter to equalize any tolerance discrepancies of the two bearer segments which may arise during manufacture during their installation within the cast shell connector pieces. In addition to the improved crash behavior of the stepwise deformable bearing structure in the frontal region of a passenger car, easy replacement of individual deformed pieces of the bearing structure is now possible after a collision has occurred.

In the case described above, if the location of the connection point for joining the supporting bearer member to the longitudinal bearer member is chosen too far forward along the longitudinal bearer member, the supporting function of the bearer member for the suspension strut mount becomes unfavorable and the transmission of force to the upstanding suspension strut mount by the resulting acute angle subtended by the longitudinal bearer member and the upwardly inclined supporting bearer member becomes too small and the deformation behavior of the front section of the car becomes unfavorably stiff. If, on the other hand, the upwardly inclined supporting bearer member is joined to the longitudinal bearer member at a location too close to the juncture for the bearer member which supports the suspension strut mount, the division of the impact force and the additional support offered by the longitudinal bearer member are reduced even though the supporting function provided by the upright bearer member for the suspension strut mount is favorably increased. Therefore, according to the invention, it is advisable to position the slanting supporting bearer member such that it subtends an angle of approximately 45° with the longitudinal bearer.

In another aspect of the invention, rather than employing the usual, single-wall support structure for joining the suspension strut mount to the longitudinal bearer, it is proposed to design this support structure as a closed hollow section member such that it serves as a suspension strut mount bearer member. Such a closed cross section exhibits significantly more rigidity than an open sheet metal shell and also serves to absorb impact energy in the crash test, thereby improving its desired supporting function and crash behavior of the front-end bearing structure.

According to another aspect of the invention, it is advisable to dimension the cross sectional width dimension of the suspension strut mount bearer member to be at least as wide as the width of the longitudinal bearer member in the bottom end region where it connects to the bottom longitudinal bearer member.

A suspension strut mount bearer member of the type described having a desired closed hollow section dimension may be easily fashioned in the conventional manner using sheet metal shell pieces. However, it is preferred to use a cast metal piece or even an extruded section piece, since the rigidity may be further improved by appropriate dimensioning of wall thicknesses. It is also advantageous to fabricate the bearer members and/or the suspension strut mount as extruded light metal sections or as cast light metal pieces, especially where the bearer arrangement of the invention is to be implemented within the bearing structure of a vehicle bodywork fabricated from extruded light metal sections and light metal joining elements.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 is a side view in schematic fashion of a bearing structure 1 in the front left side region of a bodywork 2 of a passenger car constructed in accordance with one embodiment of the present invention. The left side bearing structure 1 shown consists of a segmented longitudinal bearer member 3, a connection element 4 for joining the longitudinal bearer member 3 to a sill 5, a suspension strut mount 6, and a front door column 7. While not shown in FIG. 1, it is understood that a right side portion of the bearing structure is similarly constructed.

The longitudinal bearer member 3 consists of two bearer segments including a forwardly disposed bearer segment 8 (i.e., forwardly disposed in the sense that it is closest to the vehicle's front end during the normal forward direction of travel) and a rearwardly disposed bearer segment 9. Both bearer segments 8 and 9 of the longitudinal bearer member are preferably fashioned as hollow bodied extruded aluminum sections. The forwardly disposed bearer segment 8 is preferably dimensioned with less rigidity such that it is a weaker member in compression and thus deforms more easily than the more rearwardly disposed bearer segment 9 of the longitudinal bearer 3.

The underside of the suspension strut mount 6 is supported by a upright bearer member 10 which lies roughly perpendicular to the rearwardly disposed bearer segment 9 onto which it is joined at its bottom end. Furthermore, the suspension strut mount 6 is also supported at its forward facing end by a slanting or diagonally-oriented supporting bearer member 11. The supporting bearer member 11 extends upwardly from the compound longitudinal bearer member at an angle of roughly 45°. The lower end of the supporting bearer member 11 preferably connects the adjoining ends of the longitudinal bearer segments 8 and 9. This arrangement shall be explained in greater detail below with reference to the enlarged fragmentary view of FIG. 3.

An additional bearer member, in this case, the suspension strut bearer member 12, connects the rearward facing end the suspension strut mount 6 to a node connector or joining element 13 disposed on the door column 7. A forward, lateral frame bearer member 14 of the roof structure is also attached to the node connector 13.

FIG. 2 shows a top view of the bearing structure 1 of FIG. 1 (the left and right side suspension strut mounts 6 are omitted for clarity). Once again, one can recognize the segmented longitudinal bearer members 3, each consisting of the forwardly disposed bearer segment 8 and the rearwardly disposed bearer segment 9. Each rearwardly disposed bearer segment 9 is connected to a corresponding side door sill 5 by a connection element 4. Furthermore, the diagonally-oriented supporting bearer members 11 which slant back in the rearward direction at roughly a 45° angle are also indicated in FIG. 2.

FIG. 3 is an enlarged fragmentary view of a first embodiment of the invention according to FIG. 1 showing the detail of the segmented longitudinal bearer member 3 consisting of the longitudinal bearer segments 8 and 9, the suspension strut mount 6, the suspension strut mount bearer member 10, and the supporting bearer member 11.

The connection of the adjoining ends of longitudinal bearer segments 8 and 9 is produced by one or more "shell-like" connector assemblies, of which one half shell connector portion 15 is clearly visible in FIG. 3. The half shell connector portions are preferably formed as cast light metal pieces such that when welded together in place as shown, the half shell connector portions positively lock the two adjoining ends of the longitudinal bearer segments 8 and 9 together. The supporting bearer member 11 is preferably integrally formed as a cast piece extension on one of the half shell connector portions 15. In the embodiment shown, the bearer member 11 has an open profile with reinforcement ribs 16. Additionally, a front fastening point 17 for attachment of an auxiliary frame is preferably formed integrally with at least one of the cast piece half shell connector portions 15 along a bottom end thereof.

The suspension strut mount bearer member 10 also embraces a closed hollow section 18. To ensure rigidity at its connection point to the longitudinal bearer segment 9, the lower region of the hollow section 10 preferably has a width dimension sufficiently wide to match the width of the longitudinal bearer segment 9.

In an alternate embodiment of the invention according to FIG. 4, the longitudinal bearer member 3 is again constructed as a segmented bearer comprising of longitudinal bearer segments 8 and 9 and the suspension strut mount 6 is again supported on the rearwardly disposed longitudinal bearer segment 9 by means of a bearer member 10 which is enclosed along its length by a hollow section 18. In this embodiment, however, the slanting supporting bearer member 11 is formed as a extruded aluminum section having a constant cross sectional dimension. As shown, the longitudinal bearer segments 8 and 9 are joined together by a welded insert-type connection piece which is designated generally at 19. As before, it is also possible to provide an auxiliary frame fastening point 17 in the region of this connection piece 19.

As is evident from the described arrangement, the use of the slanting or diagonally-oriented supporting bearer member 11 and the suspension strut mount bearer member 10, in combination with the hollow section 18, provides for a very stable and rigid bearing structure, especially in the region of the suspension strut mount 6. Also, the front end bearing arrangement exhibits a favorable deformation behavior such that only the easily replaceable parts, namely the forwardly disposed (and less rigid) longitudinal bearer segments 8, are deformed in a frontal collision of low impact energy.

Furthermore, a favorable flow of impact force is achieved in the event of a frontal collision. For example, as is best seen in FIG. 1, the impact force flows into the segmented longitudinal bearer member 3 across the forwardly disposed longitudinal bearer segment 8, which is preferably designed as a tubular "crumple zone" and represents an energy absorbing element. The impact force is then divided at the transition to the second or rearwardly disposed longitudinal bearer segment 9. A first portion of the force is transmitted upwardly along the supporting bearer member 11 to the suspension strut mount 6, which is preferably designed as a cast piece, and then across to the suspension strut bearer member 12, which is preferably designed as an extruded section, to the region of the passenger compartment and roof support.

The remainder portion of the force is directed across the longitudinal bearer segment 9 to the floor structure of the bodywork, i.e., to connector 4 and bottom side sill 5. The cross section and rigidity relationships are preferably coordinated so that a stagewise deformation behavior occurs, that is, at low speed there is a deformation of only the forwardly disposed segments 8 of the longitudinal bearer members 3, and at higher crash speeds the deformation continues in the rearward direction of the vehicle bodywork.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. In a front-end bearing structure for a vehicle bodywork comprising a frame structure of bearers which includes a pair of spaced apart longitudinal bearer assemblies disposed along bottom sides of the bodywork, each of said bearer assemblies comprising a longitudinal bearer member, an upstanding, substantially perpendicular support member connected to an upper surface of said longitudinal bearer member for supporting a front suspension strut mount at a height above said longitudinal bearer member, a diagonally-oriented supporting bearer member having a first, lower end portion connected to said longitudinal bearer member and a second, upper end portion connected to said suspension strut mount, said diagonally-oriented supporting member is disposed forwardly of said perpendicular support member, said longitudinal bearer assemblies forming a closed triangular framework, as seen in elevation, the front-end bearing structure further including a pair of generally horizontally-oriented suspension strut bearer members for connecting each of said suspension strut mounts to a respective vertically-oriented and rearwardly disposed side door pillar at an upper region thereof and adjacent a connection point for a roof column member, wherein the improvement comprises in operative combination;
   a) each of said longitudinal bearer members comprises:
      i) a pair of adjoining, axially aligned bearer segments including a first forwardly disposed bearer segment and second rearwardly disposed bearer segment;
      ii) a connector assembly connecting adjoining ends of said first and second bearer segments; and
      iii) said connector assembly comprises a pair of half shell portions wherein at least one of said half shell portions is connected to the lower end region of said diagonally-oriented supporting bearer member.

2. An improved front-end bearing structure for a vehicle bodywork as in claim 1 wherein said diagonally-oriented supporting bearer member subtends an angle of about 45 degrees with said longitudinal bearer member.

3. An improved front-end bearing structure for a vehicle bodywork as in claim 2 wherein said half shell portions comprise cast metal pieces and at least one of said half shell portions includes means for connecting an auxiliary frame member.

4. An improved front-end bearing structure for a vehicle bodywork as in claim 3 wherein said upstanding perpendicular support member is an open member in cross section and includes an additional covering piece to form a polygonal box section bearer member.

5. An improved front-end bearing structure for a vehicle bodywork as in claim 4 wherein said hollow section suspension strut mount bearer member has a cross sectional width dimension adjacent a bottom end region thereof which is at least as wide as a width dimension of said adjoining longitudinal bearer member.

6. An improved front-end bearing structure for a vehicle bodywork as in claim 5 wherein:
   a) said longitudinal bearer segments, said diagonally-oriented bearer member and said suspension strut mount comprise light metal components; and
   b) said hollow section suspension strut mount bearer member comprises sheet metal pieces welded together.

7. An improved front-end bearing structure for a vehicle bodywork as in claim 3 wherein:
   a) said longitudinal bearer segments, said diagonally-oriented bearer member and said suspension strut mount comprises light metal components; and
   b) said hollow section suspension strut mount bearer member comprises an extruded light metal section.

8. An improved front-end bearing structure for a vehicle bodywork as in claim 5 wherein:
   a) said longitudinal bearer segments, said diagonally-oriented bearer member and said suspension strut mount comprise light metal components; and
   b) said hollow section suspension strut mount bearer member comprises a cast metal piece.

9. An improved front-end bearing structure for a vehicle bodywork as in claim 3 wherein:
   a) said half shell portions of said connector assembly comprise cast metal pieces;
   b) said diagonally-oriented supporting bearer member comprises a cast metal section having an open profile in cross section view and includes at least one side surface provided with reinforcement ribs; and
   c) at least one of said half shell portions of said connector assembly is formed integral with said diagonally oriented supporting bearer member.

10. An improved front-end bearing structure for a vehicle bodywork as in claim 9 wherein said upstanding perpendicular support member includes an additional covering piece to form a polygonal box section bearer member.

11. An improved front-end bearing structure for a vehicle bodywork as in claim 10 wherein said hollow section suspension strut mount bearer member has a cross sectional which dimension adjacent a bottom end region thereof which is at least as wide as a width dimension of said adjoining longitudinal bearer member.

12. An improved front-end bearing structure for a vehicle bodywork as in claim 11 wherein:
   a) said longitudinal bearer segments, said diagonally-oriented bearer member and said suspension strut mount comprise light metal components; and
   b) said hollow section suspension strut mount bearer member comprises sheet metal pieces welded together.

13. An improved front-end bearing structure for a vehicle bodywork as in claim 11 wherein:
   a) said longitudinal bearer segments, said diagonally-oriented bearer member and said suspension strut mount comprise light metal components; and
   b) said hollow section suspension strut mount bearer member comprises an extruded light metal section.

14. An improved front-end bearing structure for a vehicle bodywork as in claim 11 wherein:
   a) said longitudinal bearer segments, said diagonally-oriented bearer member and said suspension strut mount comprise light metal components; and
   b) said hollow section suspension strut mount bearer member comprises a cast metal piece.

15. An improved front-end bearing structure for a vehicle bodywork as in claim 3 wherein:
   a) said diagonally-oriented supporting bearer member comprises a hollow section extruded piece.

16. An improved front-end bearing structure for a vehicle bodywork as in claim 15 wherein said upstanding perpendicular support member in an open member in cross section and includes an additional covering piece to form a polygonal box section bearer member.

17. An improved front-end bearing structure for a vehicle bodywork as in claim 16 wherein said hollow section suspension strut mount bearer member has a cross sectional width dimension adjacent a bottom end region thereof which is at least as wide as a width dimension of said adjoining longitudinal bearer member.

18. An improved front-end bearing structure for a vehicle bodywork as in claim 17 wherein:
   a) said longitudinal bearer segments, said diagonally-oriented bearer member and said suspension strut mount comprise light metal components; and
   b) said hollow section suspension strut mount bearer member comprises sheet metal pieces welded together.

19. An improved front-end bearing structure for a vehicle bodywork as in claim 17 wherein:
   a) said longitudinal bearer segments, said diagonally-oriented bearer member and said suspension strut mount comprise light metal components; and
   b) said hollow section suspension strut mount bearer member comprises an extruded light metal section.

20. An improved front-end bearing structure for a vehicle bodywork as in claim 19 wherein:
   a) said longitudinal bearer segments, said diagonally-oriented bearer member and said suspension strut mount comprises light metal components; and
   b) said hollow section suspension strut mount bearer member comprises a cast metal piece.

* * * * *